United States Patent
Capoldi et al.

(10) Patent No.: US 10,738,830 B2
(45) Date of Patent: Aug. 11, 2020

(54) BEARING ASSEMBLY WITH AN IMPROVED SEALING RING

(71) Applicant: Aktiebolaget SKF, Gothenburg (DE)

(72) Inventors: Bruno Capoldi, Charentenay (FR); Siegfried Derrer, Höchstadt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/437,126

(22) Filed: Jun. 11, 2019

(65) Prior Publication Data

US 2019/0390714 A1   Dec. 26, 2019

(30) Foreign Application Priority Data

Jun. 21, 2018   (DE) .......................... 10 2018 210 088

(51) Int. Cl.
*F16C 33/78* (2006.01)
*F16C 33/58* (2006.01)
*F16C 19/38* (2006.01)

(52) U.S. Cl.
CPC ........ *F16C 33/7823* (2013.01); *F16C 33/586* (2013.01); *F16C 33/7803* (2013.01); *F16C 33/783* (2013.01); *F16C 33/7886* (2013.01); *F16C 19/381* (2013.01); *F16C 2208/10* (2013.01); *F16C 2300/14* (2013.01)

(58) Field of Classification Search
CPC .............. F16C 33/7803; F16C 33/7823; F16C 33/783; F16C 33/7886; F16C 2360/31; F16C 2350/26; F16C 2300/14; F16C 2208/10; F16C 33/586; F16C 19/381; F16J 15/3204; F16J 15/322; F16J 15/3268; F16J 15/3272; F16J 15/3276; F16J 15/54
See application file for complete search history.

(56) References Cited

U.S. PATENT DOCUMENTS

| 9,765,822 B2 * | 9/2017 | Kanamoto .......... F16C 33/7846 |
| 2009/0324153 A1 | 12/2009 | Russ et al. |
| 2012/0068413 A1 | 3/2012 | Putt et al. |

FOREIGN PATENT DOCUMENTS

| JP | 2001132760 A | * | 5/2001 | .............. F16C 33/76 |
| JP | 5750539 | * | 7/2015 | |

OTHER PUBLICATIONS

Machine Translation of JP-2001132760-A (Year: 2001).*
Machine Translation of JP 5750539 (Year: 2015).*

* cited by examiner

*Primary Examiner* — Alan B Waits
(74) *Attorney, Agent, or Firm* — Garcia-Zamor Intellectual Property Law, LLC; Ruy Garcia-Zamor; Bryan Peckjian

(57) ABSTRACT

Bearing assembly of large diameter or of the slewing type, including an inner ring and an outer ring, at least one sealing ring with an axis installed on one of the inner and outer rings, for sealing a gap between the inner and outer rings and comprising: a lip portion designed in rubbing contact with the other of the inner and outer rings, a root portion at least partly engaged with an interference fit inside a holding recess arranged on a stabilizing surface of the one of the inner and outer rings, the root portion having a main lip and at least one secondary lip, the lips applying a contact pressure inside the holding recess in order to anchor the root portion on the one of the inner and outer rings, characterized in that the holding recess comprises two blocking grooves inside which the main lip is engaged with a contact pressure.

10 Claims, 4 Drawing Sheets

BEARING ASSEMBLY WITH AN IMPROVED SEALING RING

CROSS-REFERENCE TO RELATED APPLICATIONS

This application claims priority to German patent application no. 102018210088.8 filed on Jun. 21, 2018, the contents of which are fully incorporated herein by reference.

FIELD OF THE INVENTION

The invention concerns a bearing assembly, in particular a bearing of great dimension or of the slewing type.

BACKGROUND OF THE INVENTION

Large size bearings are commonly used in different kinds of industrial machines such as tunnel boring machines or excavators, or in the field of defense such as radars and tanks or armored vehicles. They are also used in cranes and for the mounting of rotor blades on wind and water turbines. Some are also used in observation wheels with capsules from where the people can contemplate the outskirts of cities.

It is often desired to seal the bearing. Traditionally, sealing rings of the contacting type are used. The sealing ring comprises an anchorage portion attached to one of the ring of the bearing, and a lip portion contacting another ring of the bearing. It is important that the anchorage portion is robust so as to ensure that the seal won't get loose in time and to guaranty a correct positioning of the sealing lip(s).

One aim of the present invention is to overcome these drawbacks.

To solve this problem, various solutions exist, such as the ones disclosed in US 2009-0324153-A1 and US 2012-0068413-A1.

Improvements are still possible.

SUMMARY OF THE INVENTION

It is a particular object of the present invention to provide a bearing assembly, in particular of great dimension or of the slewing type, with an inner ring, an outer ring and at least one sealing ring installed on one of the inner and outer rings and for sealing a gap between the inner and outer rings.

According to the invention, the sealing ring comprises a lip portion which is designed to be in rubbing contact with the other of the inner and outer rings, and a root portion at least partly engaged with interference fit inside a holding recess arranged on a stabilizing surface of the one of the inner and outer rings. The root portion comprises a main lip and at least one secondary lip, the lips applying a contact pressure inside the holding recess in order to anchor the root portion on the one of the inner and outer rings.

Still according to the invention, the holding recess comprises two blocking grooves inside which the main lip is engaged with a contact pressure.

Thanks to the invention, the anchorage of the sealing ring is reinforced, and the sealing ring is hold tight on the bearing ring, both axially and radially.

According to other aspects of the invention which are advantageous but not compulsory, such a bearing assembly may incorporate one or several of the following features:

the blocking grooves face each other and each comprise a bottom so that the distance between the two bottoms is larger than a width W of the holding recess;

the holding recess is an annular groove and the main lip and the at least one secondary lip are annular;

the blocking grooves each comprises a blocking surface which extends in a plane parallel to the stabilizing surface, and in that the main lip comprises a blocking surface which is in pressure contact with the blocking surfaces of the blocking grooves;

the sealing ring further comprises a stiffener extending in a direction substantially perpendicular with respect to the root portion of the sealing ring and comprising a blocking surface which is flat and substantially perpendicular to the axis of the sealing ring, the blocking surface of the stiffener and the blocking surface of the main lip each exerting simultaneously a spring force respectively on the stabilizing surface of the bearing ring and on the blocking surfaces of the blocking grooves in such a way that the two spring forces have the same amplitude and are in opposite direction, the directions being perpendicular to the stabilizing surface;

at least the tip of the lip portion, the main lip, the at least one secondary lip and the stiffener comprise elastomeric material;

in a free state of the sealing ring, the at least one secondary lip has a width Wi larger than the width of the holding recess;

the sealing ring further comprises a hinge located between the lip portion and the root portion and which allows for the lip portion to bend around the hinge with respect to the root portion once the sealing ring is installed on the bearing assembly;

the lip portion has a frustoconical cross section (according to a plane comprising the axis of the bearing assembly) so that the width of its tip is thinner than the opposite side close to the hinge 53;

the holding recess comprises an entry with two chamfers for facilitating the introduction of the main and at least one secondary lip inside the holding recess.

BRIEF DESCRIPTION OF THE SEVERAL VIEWS OF THE DRAWING

The present invention and its advantages will be better understood by studying the detailed description of specific embodiments given by way of non-limiting examples and illustrated by the appended drawings on which.

DETAILED DESCRIPTION OF THE INVENTION

Figure 1:
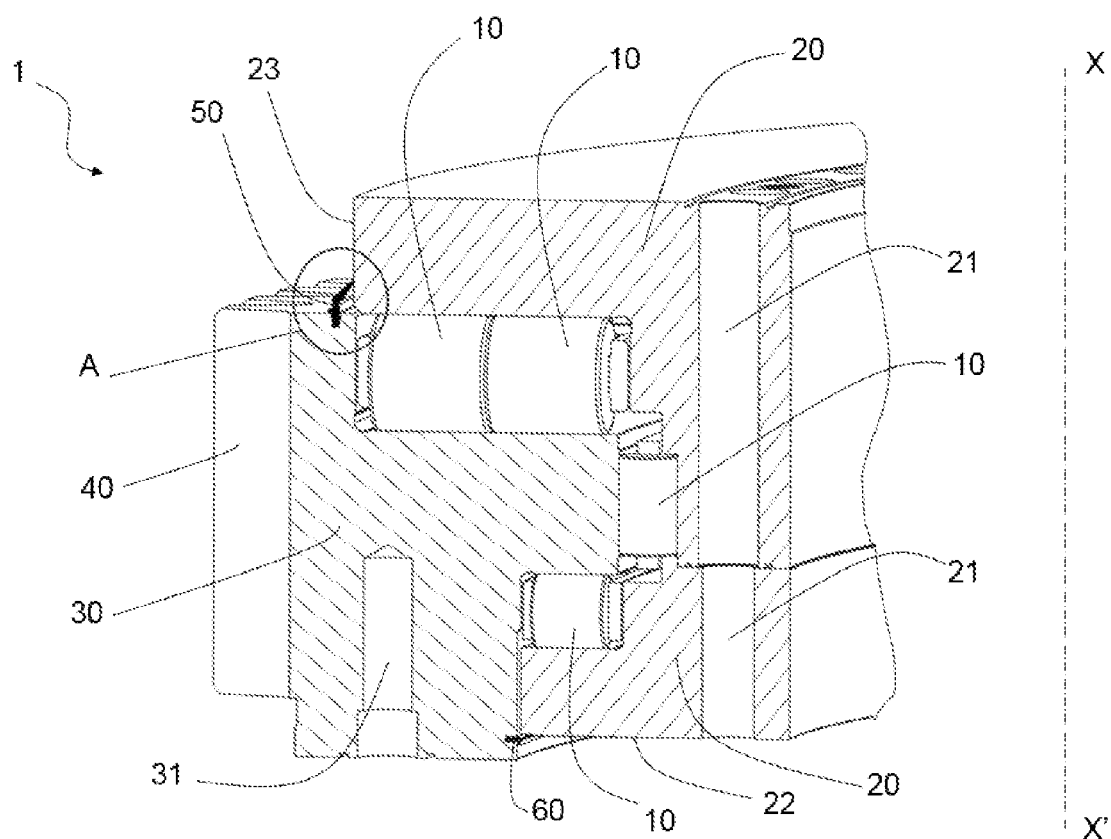
FIG. 1 is a partial sectional view in a radial plane with respect to a longitudinal and rotational axis XX' of a bearing assembly according to the invention.

FIG. 1 illustrates a bearing assembly 1 comprising an inner ring 20 and an outer ring 30, both rings being rotatable around a longitudinal axis XX'. The bearing assembly 1 also comprises rolling elements 10 (cylindrical rollers in the illustrated embodiment) in contact with raceways arranged on both rings.

The inner ring and outer rings comprise fixation means 21, 31, such as holes and threaded holes, for attachment to parts (not illustrated) of a machine or a device such as a wind turbine, in particular to rotatably adapt the pitch and yaw of blades.

In the illustrated embodiment, in use, the inner ring 20 is rotating and the outer ring 30 is not-rotating.

The outer ring 30 comprises a toothing 40 for gearing with another toothing connected for instance to an electrical motor.

The bearing assembly also comprises at least one sealing ring 50, 60 for sealing gaps between the inner and outer rings.

In the illustrated embodiment, the bearing assembly 1 comprises two sealing rings 50, 60 which are similar.

In a preferred embodiment, not illustrated, the sealing rings 50, 60 are homothetical.

Advantageously, as illustrated, the sealing ring 50 is annular and has an axis of symmetry X1X2 around which it is intended to rotate.

Figure 2:
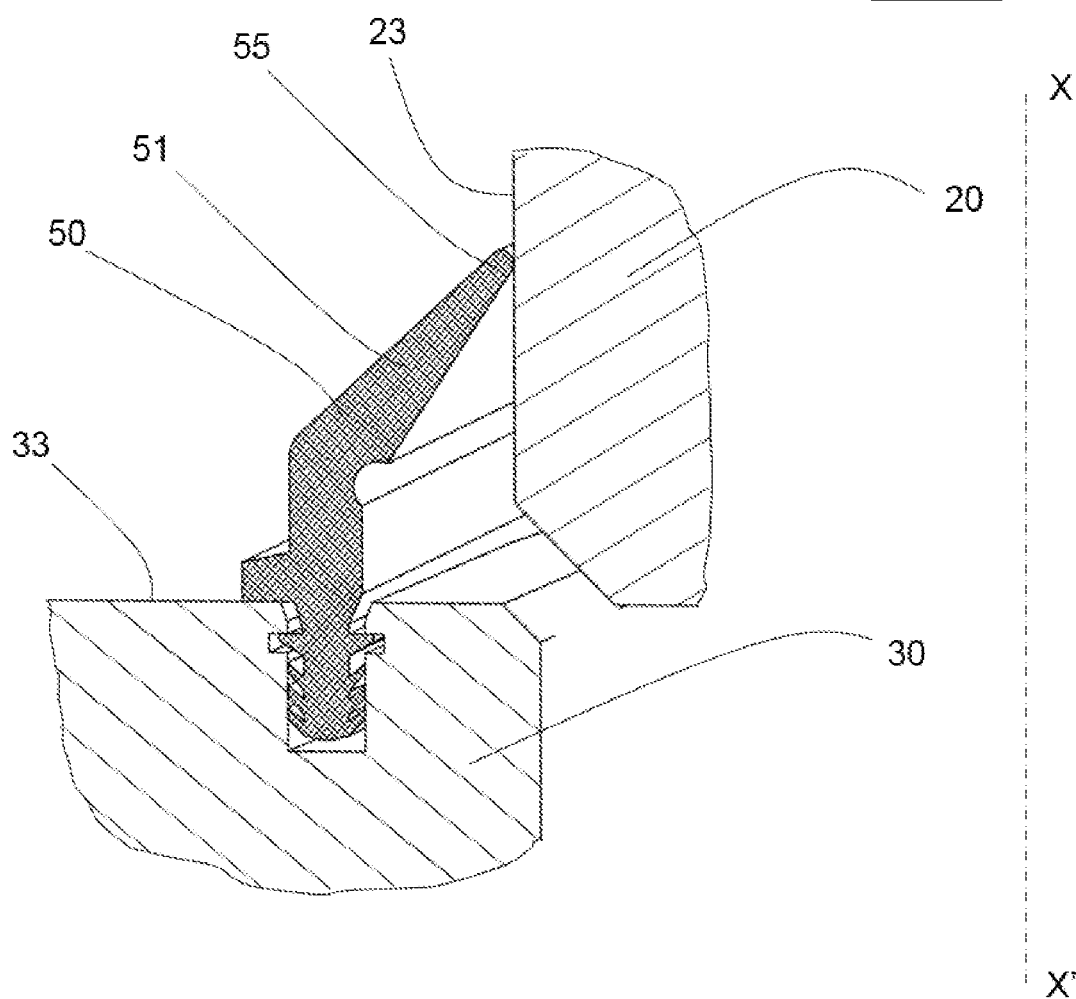
FIG. 2 is a detailed sectional view of the positioning of a sealing ring with respect to two rings of the bearing assembly of FIG. 1 (detail A)
Figure 3:
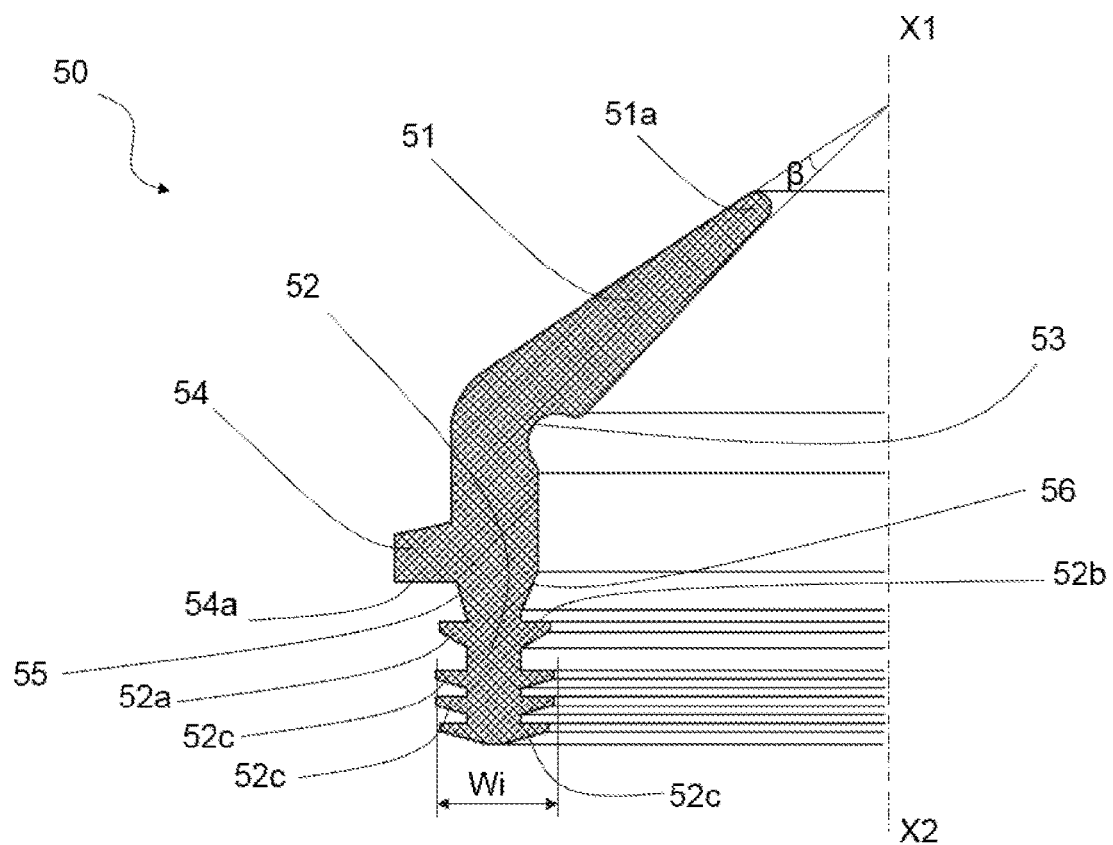
FIG. 3 is partial radial sectional view of the sealing ring of FIGS. 1 and 2.

As best illustrated on FIGS. 2 and 3, the sealing ring 50 comprises a lip portion 51 and a root portion 52. The lip portion 51 comprises a tip 51a which is intended to be in pressure contact with a rubbing surface 23 of the inner ring 20 during normal operation of the bearing assembly. Between the lip portion 51 and the root portion 52, there is a hinge 53 which allows for the lip portion 51 to bend around the hinge with respect to the root portion 52, in order to compensate for misalignment and runout, for instance of the rubbing surface 23.

In the illustrated embodiment of the invention, the lip portion 51 has a frustoconical cross section (according to a plane comprising the axis X1X2) so that the width of its tip 51a is thinner than the opposite side close to the hinge 53. The frustoconical shape is characterized by an angle $\beta$ which is preferably comprised between 30° and 50° in a free state, and between 20° and 40° in the working state (normal operation of the bearing assembly).

Other shapes can be used for lip portion 51, depending on several parameters such as the desired sealing properties and the available space for the sealing ring.

The root portion 52 is at least partly engaged with interference fit inside a holding recess 32 arranged on a stabilizing surface 33 of the outer ring 30.

The root portion 52 comprises one main lip 52a which is annular and statically seals the holding recess 32. The main lip 52a further contributes in locking the sealing ring 50 on the outer ring 30.

The root portion 52 also comprises at least one secondary lip 52c which is annular.

In the illustrated embodiment, there are 3 secondary lips 52c, and they contribute in locking the sealing ring 50 on the outer ring 30. The secondary lips 52c further contribute in centering the root portion 52 of the sealing ring inside the holding recess 32.

Figure 4:
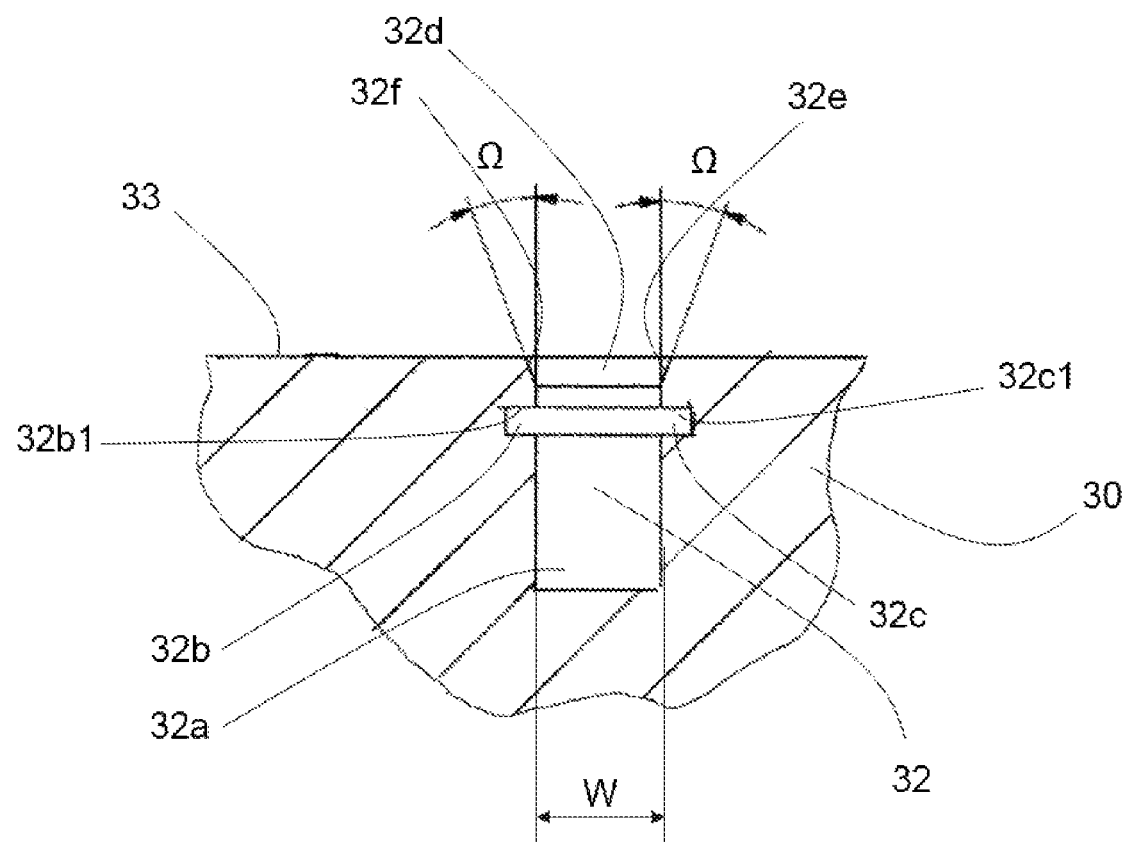
FIG. 4 is detailed partial sectional view of a ring of the bearing assembly of FIGS. 1 and 2 where the sealing ring is anchored.

In the illustrated embodiment, as best visible on FIG. 4, the holding recess 32 is a circumferential groove which extends substantially perpendicularly to the stabilizing surface 33. The holding recess 32 has a width W which is advantageously constant all over its circumference. The width W is measured radially with respect to the axis XX'.

The sealing ring 50 further comprises a stiffener 54 (which function will be described later on) which extends in a direction substantially perpendicular with respect to the root portion of the sealing ring.

In a free state of the sealing ring, the main 52a and secondary 52c lips of the root portion 52 each have a width Wi which is larger than the width W of the holding recess 32.

In that free state, the main and secondary lips of the root portions may have the same of different width Wi with respect to each other.

In that free state, the main lip 52a comprises a blocking surface 52b which is flat and substantially perpendicular to the axis X1X2 of the sealing ring.

In that free state, the stiffener 54 comprises a blocking surface 54a which is flat and substantially perpendicular to the axis X1X2 of the sealing ring 50.

Hence, in a free state of the sealing ring, the blocking surface 52b of the main lip 52a and the blocking surface 54a of the stiffener 54 are flat and parallel.

During the installation of the sealing ring onto the bearing ring, the main 52a and secondary lips 52c of the root portion deform elastically when engaging by contact in the holding recess 32.

Advantageously, the holding recess 32 comprises an entry 32d with two chamfers 32e for facilitating the introduction of the main and secondary lips inside the holding recess 32. The two chamfers are identical and each form, with respect to a direction perpendicular to the stabilizing surface 33 of the bearing ring, an angle $\Omega$.

The holding recess 32 further comprises two blocking grooves 32b, 32c which are located under the stabilizing surface 33 of the bearing ring and which extend in a plane parallel to the stabilizing surface 33. The two locking grooves 32b, 32c face each other, and they comprise each a bottom, so that the distance between the two bottoms is larger than the width W of the holding recess 32.

Each groove 32b, 32c respectively comprises a blocking surface 32b1, 32c1 which extends in a plane parallel to the stabilizing surface 33.

During its installation, the sealing ring is progressively pushed towards the bottom of the holding recess 32, until the main lip 52a of the root portion engages in the blocking grooves 32b, 32c.

Once the installation position of the sealing ring is reached, the main lip 52a, the secondary lips 52c and the stiffener each present a permanent elastic deformation.

In that position, the secondary lips 52c have a width which is now equal to the width W of the holding recess 32, and they are in pressure contact with the holding recess.

In that position, the main lip 52a has a width which is substantially still the same as in the free state.

In that position, the main lip 52a is in pressure contact, in the grooves 32b, 32c only with the blocking surfaces 32b1, 32c1. This reinforces the anchorage of the sealing ring inside the holding recess 32. In that position, the main lip 52a doesn't contact the bottom of the blocking grooves 32b, 32c.

Still in the position where the sealing ring is installed, as illustrated on the FIGS. 1 and 2, the blocking surface Ma of the stiffener 54 is in pressure contact with the stabilizing surface 33 of the bearing ring.

In that position, the blocking surface 54a of the stiffener 54 and the blocking surface 52b of the main lip 52a each exert simultaneously a spring force respectively on the stabilizing surface 33 of the bearing ring and on the blocking surfaces 32b1, 32c1 of the grooves 32b, 32c. The spring forces have the same amplitude and are in opposite direction, the directions being perpendicular to the stabilizing surface 33.

Thanks to this particular arrangement, the anchorage of the sealing ring is further reinforced, and the sealing ring is hold tight on the bearing ring, both axially and radially.

In the illustrated embodiment of the invention, for the sealing ring 50 described earlier, the blocking recess 32 extends axially with respect to the axis XX' of the bearing assembly, and the blocking grooves 32b, 32c extend radially with respect to the axis XX'. The blocking groove 32b extends radially outwardly, the blocking groove 32c extends radially inwardly, and the blocking surfaces 32b1, 32c1 extend radially.

In the illustrated embodiment of the invention, there is a second sealing ring 60, similar to the first sealing ring 50 described earlier. This second sealing ring 60 has a root portion which engages in a holding recess which extends radially inside the bearing ring (the outer ring in the illustrated embodiment) onto which it is installed.

The root portion of the sealing ring 50 further comprises slopes 55, 56 which provide more freedom of movement for the main lip 52a.

While the main and secondary lips of the sealing ring contribute to lock the sealing ring onto the bearing ring, so as to prevent for instance its accidental removal from the holding recess, it is still possible to remove the sealing ring by pulling it outwardly from the holding recess of the bearing ring with a large force (larger than a force that could be generated during normal operation of the bearing assembly), which turns advantageous when for instance it is desired to replace the sealing ring during a maintenance operation.

Generally speaking, the sealing ring can be installed either on an inner or an outer ring of the bearing assembly, irrespective of which bearing ring is the rotating one.

Several sealing rings according to the invention can be used to seal axial or radial or combined axial/radial gaps between rings of the bearing assembly.

Preferably, at least the tip 51a of the lip portion 51, the main lip 52a, the at least one secondary lip 52c and the stiffener comprise elastomeric material.

NOMENCLATURE

XX', X1X2 axis
W, Wi width
β, Ω angle
1 bearing assembly
10 rolling elements
20 inner ring
21 fixation means
22, 23 rubbing surface
30 outer ring
31 fixation means
32 holding recess
32a bottom
32b, 32c blocking groove
32b1, 32c1 blocking surface
32d entry
32e, 32f chamfer
33 stabilizing surface
40 toothing
50, 60 sealing ring
51 lip portion
51a tip
52 root portion
52a main lip
52b blocking surface
52c secondary lip
53 hinge
54 stiffener
54a blocking surface
55, 56 slope

What is claimed is:

1. A bearing assembly comprising:
   an inner ring,
   an outer ring,
   at least one sealing ring including an axis and installed on one of the inner and outer rings, for sealing a gap between the inner and outer rings, the at least one sealing ring comprising:
   a) a lip portion configured to be in rubbing contact with the other of the inner and outer rings, and
   b) a root portion at least partly engaged with an interference fit inside a holding recess arranged on a stabilizing surface of the one of the inner and outer rings,
   the root portion comprising a main lip and at least one secondary lip, the lips applying a contact pressure inside the holding recess in order to anchor the root portion on the one of the inner and outer rings,
   wherein the holding recess, when viewed in cross-section, comprises a first blocking groove and a second blocking groove,
   wherein the main lip, when viewed in cross-section, comprises a first main lip blocking surface and a second main lip blocking surface,
   wherein the first main lip blocking surface is engaged with the first blocking groove and second main lip blocking surface is engaged with the second blocking groove, and,
   wherein the main lip does not contact a bottom surface of the first blocking groove or a bottom surface of the second blocking groove.

2. The bearing assembly according to claim 1, wherein the blocking grooves face each other and each comprise a bottom so that the distance between the two bottoms is larger than a width W of the holding recess.

3. The bearing assembly according to claim 1, wherein the holding recess is an annular groove and the main lip and the at least one secondary lip are annular.

4. The bearing assembly according to claim 1, wherein the first blocking groove comprises a first blocking groove blocking surface and the second blocking groove comprises a second blocking groove blocking surface, the first blocking groove blocking surface and the second blocking groove blocking surface extending in a plane parallel to the stabilizing surface, and
   wherein the first main lip blocking surface is in pressure contact with the first blocking groove blocking surface and the second main lip blocking surface is in pressure contact with the second blocking groove blocking surface.

5. The bearing assembly according to claim 1, wherein the sealing ring further comprises a stiffener, the stiffener extending in a direction substantially perpendicular with respect to the root portion of the sealing ring and comprising a blocking surface, which is flat and substantially perpendicular to the axis of the sealing ring, the blocking surface of the stiffener and the blocking surface of the main lip each exerting simultaneously a spring force respectively on the stabilizing surface of the bearing ring and on the blocking surfaces of the blocking grooves in such a way that the two spring forces are in opposite directions, the opposite directions being perpendicular to the stabilizing surface.

6. The bearing assembly according to claim 5, wherein at least the tip of the lip portion, the main lip, the at least one secondary lip, and the stiffener comprise elastomeric material.

7. The bearing assembly according to claim 1, wherein in a free state of the sealing ring, the at least one secondary lip has a width (Wi) larger than the width (W) of the holding recess.

8. The bearing assembly according to claim 1, wherein the sealing ring further comprises a hinge located between the lip portion and the root portion that enables the lip portion to bend around the hinge with respect to the root portion once the sealing ring is installed on the bearing assembly.

9. The bearing assembly according to claim 1, wherein the lip portion has a frustoconical cross section so that the width of its tip is thinner than the opposite side close to the hinge.

10. The bearing assembly according to claim 1, wherein the holding recess comprises an entry with two chamfers for facilitating the introduction of the main lip and at least one secondary lip inside the holding recess.

\* \* \* \* \*